United States Patent [19]

Warren et al.

[11] Patent Number: 5,652,519

[45] Date of Patent: Jul. 29, 1997

[54] METHOD AND APPARATUS FOR MEASURING POLLUTANTS CONTAMINATING EARTH FORMATION

[75] Inventors: Roy K. Warren, Houston, Tex.; Jesse G. Robison, 5819 Southminster, Houston, Tex. 77035

[73] Assignee: Jesse G. Robison, Houston, Tex.

[21] Appl. No.: 620,757

[22] Filed: Mar. 18, 1996

Related U.S. Application Data

[63] Continuation of Ser. No. 181,989, Jan. 13, 1994, abandoned.

[51] Int. Cl.$^6$ .................................................. G01V 3/10
[52] U.S. Cl. .................................................... 324/339
[58] Field of Search ............................. 324/332, 333, 324/334, 335, 336, 337, 338, 339, 340, 341, 342, 345, 346, 357

[56] References Cited

U.S. PATENT DOCUMENTS

| | | | |
|---|---|---|---|
| 2,746,009 | 5/1956 | McLaughlin . | |
| 2,919,397 | 12/1959 | Morley | 324/334 |
| 3,317,821 | 5/1967 | Putton et al. | 324/346 |
| 3,391,334 | 7/1968 | Ruehle . | |
| 4,047,098 | 9/1977 | Duroux | 324/335 |
| 4,247,821 | 1/1981 | Buselli et al. | 324/336 |
| 4,290,020 | 9/1981 | Hansen et al. | 324/334 |
| 4,323,848 | 4/1982 | Kuckes . | |
| 4,502,010 | 2/1985 | Kuckes . | |
| 4,742,305 | 5/1988 | Stolarczyk | 324/334 |
| 4,748,415 | 5/1988 | Vail, III . | |
| 4,755,944 | 7/1988 | Glass | 324/339 X |
| 4,849,699 | 7/1989 | Gill et al. | 324/339 |
| 4,901,023 | 2/1990 | Vail, III . | |
| 5,065,100 | 11/1991 | Vail, III . | |
| 5,208,539 | 5/1993 | Holmquist et al. | 324/339 |
| 5,260,661 | 11/1993 | Vail, III . | |
| 5,355,088 | 10/1994 | Howard, Jr. | 324/339 |
| 5,442,293 | 8/1995 | Lange | 324/332 |

*Primary Examiner*—Sandra L. O'Shea
*Assistant Examiner*—Roger Phillips
*Attorney, Agent, or Firm*—Pravel, Hewitt, Kimball & Krieger

[57] ABSTRACT

Methods and apparatus for measuring pollutants contaminating earth formation. Specifically, the invention involves the three dimensional, spatially continuous imaging of sub surface conditions using electromagnetic induction techniques. The technique utilizes the resistivity of near surface volumes of earth formation in order to determine and graphically represent the magnitude and migration of pollutants. Included in the invention are the logging techniques and apparatus as well as the method of converting the captured data into a pseudo resistivity log suitable for a three dimensional imaging of sub surface conditions.

19 Claims, 4 Drawing Sheets

BRANCH A          BRANCH B

METHOD AND APPARATUS FOR MEASURING POLLUTANTS CONTAMINATING EARTH FORMATION

This is a continuation of application Ser. No. 08/181,989 filed on Jan. 13, 1994, now abandoned.

BACKGROUND OF THE INVENTION

This disclosure sets forth methods and apparatus for measuring pollutants contaminating earth formations. More particularly, the invention involves the three dimensional mapping of the resistivity of near surface volumes of earth formation, the premise being that pollutants such as hydrocarbons and brine usually exhibit a significantly higher resistivity and lower resistivity, respectively, than most virgin earth formations. By mapping three dimensional resistivity contours of the site under investigation, the location, magnitude and migration of pollutants can be quantitatively determined.

The pollution of near-surface earth formations is a problem drawing world wide concern. Leaking underground gasoline, fuel oil and other hydrocarbon storage tanks are a major source of pollution of potable ground waters. Likewise, brine used in borehole drilling operations and stored in surface and underground storage containers is also a major ground water pollutant. Another source of pollution is natural saline water from deep formations which often migrates toward shallow potable ground water formations, the initial path of migration being around oil and gas well casing which has not been properly cemented to obtain the desired zonal isolation.

The detection, quantification and monitoring of pollutants near the surface of the earth has historically been an expensive and time consuming operation. Traditional techniques involve the drilling of a multiplicity of shallow boreholes throughout the area of concern, retrieving of core samples from the drilling operation, and analyzing the core samples for pollutants. This technique will not detect any polluted areas which have not actually penetrated by a borehole. A second technique involves the drilling of a multiplicity of monitor wells throughout the area of concern. Sensors are temporarily or permanently placed at varying depths within the monitor wells, and various parameters indicative of the pollutants are measured as a function of time. The basic premise of this technique is that either the boreholes penetrate the pollutants or the pollutants will migrate with time to the vicinity of one or more boreholes thereby being detected by the borehole sensors. Again, this technique is very expensive and time consuming, especially if detection requires the pollutants to migrate to the vicinity of the borehole before being detected.

It is highly desirable to obtain a spatially continuous, three dimensional measurement of possible pollutants in the area of concern. Pollutants can and often are initially isolated within small volumes or traps, only to migrate in time over a larger area. There is a high probability that discrete sampling techniques such as well bore core sampling or even monitor well measurements over time will not detect pollutants until they have contaminated an extensive volume of earth formation. At this point, remedial clean up is extremely costly and significant environmental damage has already occurred.

Surface transmitters and well borehole receivers have been used in the past to determine resistivity of intervening earth formation. U.S. Pat. No. 2,746,009 to McLaughlin et al. discloses a method directed to locating ore bodies. Main and vernier transmitter coils are set at one location at the surface and a receiver is conveyed along a nearby bore hole. The receiver coil detects primary signal and any secondary signal resulting from a low resistivity ore body anomaly. The vernier coil is rotated about its axis giving measurements which are related to the direction of an ore body in a plane comprising the main transmitted, the vernier transmitter, the downhole receiver, and the ore body. The method of McLaughlin et al. does not, however, yield a three dimensional map of resistivity anomalies. Ruehie discloses in U.S. Pat. No. 3,391,334 the use of a surface transmitter and three vertically spaced borehole receivers to measure resistivity of a layer of earth formation bounded by the vertical extent of the receiver array. A three dimensional subterranean map of resistivity cannot be obtained using the method disclosed by Ruehie.

U.S. Pat. Nos. 4,323,848 and 4,502,010 to Kuckes discloses means of measuring the resistivity of earth formations using a surface transmitter and a downhole receiver comprising a magnetometer. The thrust of both inventions is directed to improvements of the magnetometer receiver. Two embodiments of the surface transmitter are disclosed. Spatially continuous three dimensional measurements of resistivity cannot be obtained using the means or methods taught by Kuckes. The first embodiment comprises a circular antenna concentric with the top of the wellbore with the axis of the loop being perpendicular to the plane of the surface of the earth. The second embodiment comprises two electrodes inserted in to the earth surface on opposite sides of the top of the borehole. In both embodiments, the transmitter remains fixed with respect to the position of the borehole.

U.S. Pat. Nos. 4,748,415; 4,901,023; 5,065,100 and 5,260,661 to Vail, III are directed toward measuring the resistivity of earth formation from within a borehole cased with highly conducting material such as steel. Surface transmitters are employed as well as downhole receivers. In one embodiment, two surface transmitters comprising circular antennas are used with the first being concentric with the top of the borehole and the second being positioned remote from the borehole with the axis being perpendicular to the plane of the earth's surface. The transmitters remain fixed with respect to the position of the borehole. The frequencies are in the 0.001 to 20 Hz range. Low frequencies such as these are needed to penetrate the highly conducting borehole casing. Resolution, being related to frequency, is correspondingly low. As with all of the prior cited patents, spatially continuous measurements in three dimensions are not obtainable using the disclosures of Vail, III.

BRIEF SUMMARY OF THE INVENTION

The current invention involves three dimensional, spatially continuous imaging of subsurface conditions using electromagnetic induction techniques. The method requires one well bore which is either open or cased with a non conducting material such as fiberglass or transite. A transmitter coil is placed on the surface of the earth with the axis of the coil perpendicular to the surface of the earth and offset from the axis of the borehole. An alternating current is applied to the coil thereby generating a primary magnetic field with the same frequency within the earth. Should the lines of force of the induced primary field intercept an intervening layer or area of contrasting resistivity or conductivity, an electromagnetic force is created within the area of contrasting resistivity according to Faraday's law. In response to this induced electromagnetic field, eddy currents will flow in the contrasting layer in a plane perpendicular to the lines of force of the primary field generated by the surface coil transmitter. Current flow induced in the contrasting layer generates a secondary magnetic field with lines of force that oppose the primary magnetic field.

While the surface transmitter coil is generating primary and possibly secondary fields, a receiver coil enclosed within a fluid tight probe made of non conducting material is drawn up the borehole. Both the primary and secondary fields induce corresponding signals in the receiver coil with the magnitude of the signals being related to the strength of the induced fields. The response of the receiver coil is transmitted to the surface for recording and subsequent processing by conductors within the cable supporting the probe. Total field strength as measured by the receiver coil is measured as a function of depth within the borehole. The primary field induces a signal which varies slowly with depth. Any secondary signal caused by eddy currents moving around a layer or layers of contrasting resistivity will be recorded as secondary signal, superimposed on the primary signal, but which varies more rapidly with depth. Once the probe containing the receiver coil is drawn to the surface, the transmitter coil is moved to another position on the surface of the earth, the probe is again lowered into the borehole, and pulled from the borehole, again recording or "logging" the composite induced primary and secondary signal. The transmitter coil is placed in a multiplicity of positions on the surface of the area being investigated, with an induced signal or "induction" log being recorded for each transmitter coil location until the survey is completed.

A second embodiment of the invention utilizes two receiver coils axially positioned within the probe with a spacing of approximately two feet. The coils are wound so that polarities of induced voltages are opposite. This receiver coil arrangement measures the gradient of the induced field. Since the primary field is slowly varying in depth with respect to the secondary field, the gradient coil arrangement tends to cancel the effects of the primary field thereby increasing the measured ratio of secondary to primary plus secondary induced voltage. The basic concepts of the invention will, however, be illustrated using a probe containing a single receiver coil.

The survey produces a set of raw induction measurements with each measurement being assigned a Cartesian coordinate (x,y,z). The values of coordinates x and y corresponding to the location of the surface transmitter coil and z corresponding to the depth within the borehole at which the induction measurement is made. The three dimensional set of data is then preprocessed to remove noise, extract the secondary signal generated by any and all layers or areas of contrasting resistivity, and the secondary signal is converted from a measurement of induction in units of millivolts into a more conventional measurement of resistivity in units of ohm-meters. The converting of the measured induced voltages in millivolts to resistivity in units of ohm-meters can be made at essentially any point in the data processing sequence.

It should be noted that the surface area above the survey area is not necessarily level or flat. The elevation of the surface transmitter coil might vary with respect to the top of the borehole as the coil is moved from position to position during the survey. It is necessary, therefore, to normalize each subset of data measured at a given transmitter coil location (x,y) to a reference elevation defined as $z_r$.

At this point in the processing of the data, a three dimensional array of resistivity measurements has been generated. The resistivity measurements are computed from secondary induction signal and are, therefore, measures of resistivity of contrasting layers such as layers of pollution within the survey area. The array has also been normalized to a reference elevation. The preprocessed data set is then processed with three dimensional graphics manipulation and a display computer program. Resistivities are contoured, thereby producing three dimensional displays .of distributions of pollutants within the survey area. "Slices" of the image in either the x-y, x-z or y-z plane can also be displayed. Volumes of pollutants can be computed from the three dimensional contours.

The transmitter coil is operated at a frequency of approximately 500 Hz in a narrow bandwidth to minimize interferences from manmade field sources such as power lines, generators and the like. The diameter of the coil is 5 feet. Typical output voltage is 45 volts with a current of 2 amperes. The probe is pulled from the borehole at a speed of approximately 10 ft./min. with readings being recorded at 0.1 foot intervals. Meaningful signals can be obtained at borehole depths as great as 300 feet. Sites as large as six acres can be monitored from a single borehole. It has been found that good contrast of polluted areas is obtained so long as the resistivity of the virgin earth formation is 30 to 40 ohm-meters or less.

BRIEF DESCRIPTION OF THE DRAWINGS

So that the manner in which the above recited features, advantages and objectives of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are, therefore, not to be considered limiting of its scope, for the invention may admit to other equally effective embodiments.

DETAILED DESCRIPTION OF THE PREFERRED EMBODIMENT

Figure 1:
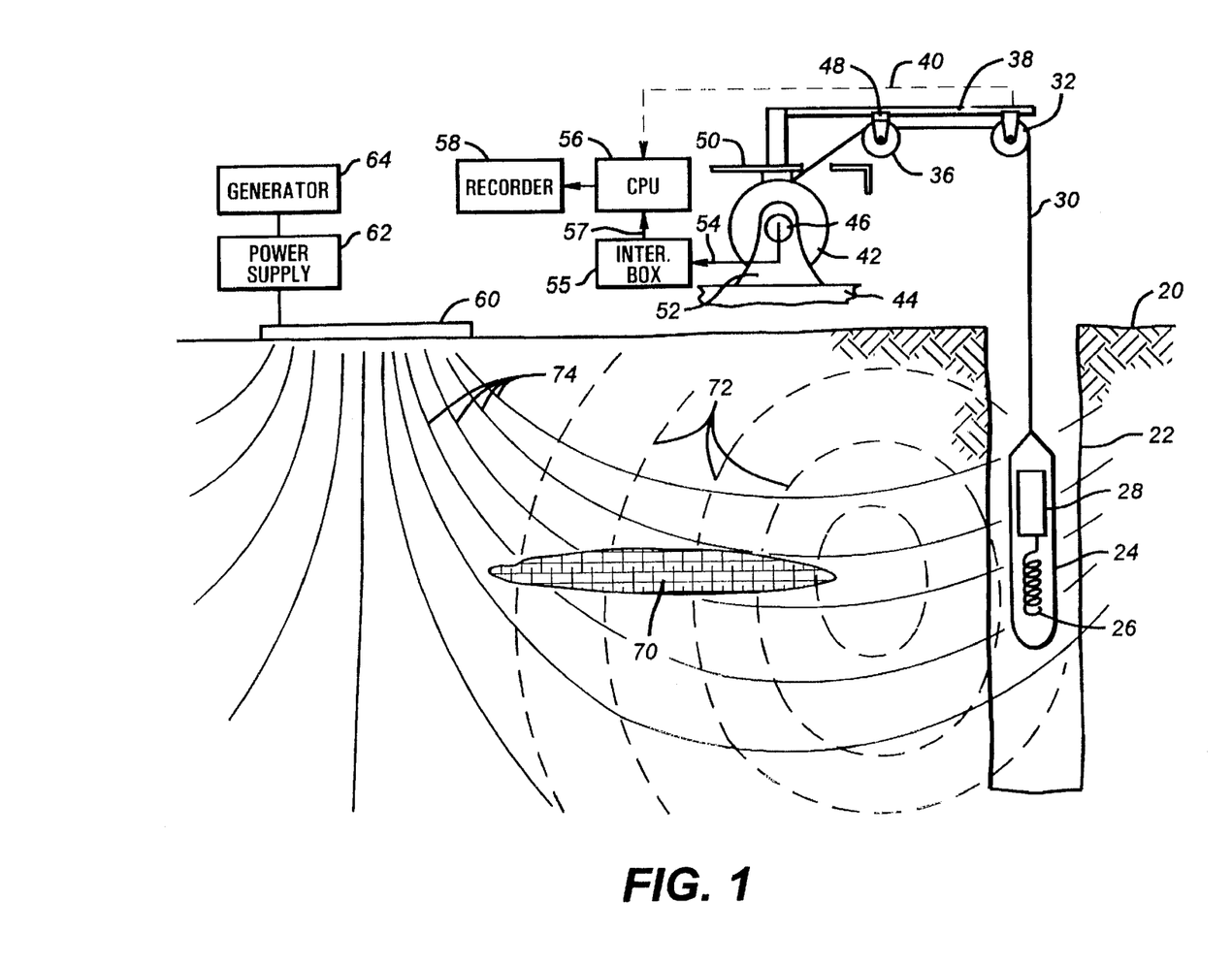
FIG. 1 illustrates the overall equipment arrangement used in the invention, with the basic concept of induced magnetic fields and the response of the field to contrasting areas of resistivity also being illustrated.

The basic concepts of the invention are best understood by referring to FIG. 1. An essentially circular transmitter coil 60, with a diameter of five feet and comprising 36 turns of 12 gauge wire, is positioned on the surface 20 of the earth with the axis of the coil being perpendicular to the plane of the surface of the earth. The generator 64, with an output of at least 6.5 kW, supplies power to a power supply 62 of the type manufactured by Elgar or the equivalent. The power supply is set at a frequency of 455 +/− 10 Hz but can be varied to values as low as 263 +/− 10 Hz. The frequency employed is dependent upon the desired horizontal range and frequency resolution for the survey being performed, but the preferred frequency of operation is about 455 Hz. The power supply 62 regulates power from the generator 64. The output of power supply 62 is electrically connected to the transmitter coil 60. The output parameters for the transmitter coil 60 are preferably within the range of 2.0 to 4.0 amperes at approximately 45 volts. The alternating current within the transmitter coil 60 induces a primary magnetic field, with associated lines of force 74, which radiate out from the transmitter coil into the adjacent earth formation. Should the force field 74 encounter a region of contrasting electrical resistivity, such as the region depicted by numeral 70 in FIG. 1, eddy currents will be induced in the region of contrast according to Faraday's law. These eddy currents, with a frequency of the power applied to transmitter coil 60, will themselves generate a secondary magnetic field with associated lines of force 72 which oppose the primary force field 74.

FIG. 1 also depicts a borehole 22 in the general vicinity of the location of transmitter coil 60. A fluid tight probe 24 made of non conducting material such as PVC, transite, Lucite or the like is attached to a cable 30 which contains one or more electrical conductors. The cable serves as a means of raising and lowering the probe in borehole 20 as well as a path of electrical communication between the probe and the data processing equipment 56 and data recording equipment 58 located at the surface 20 of the earth. The cable 30 is passed over a first sheave wheel 34 which is attached to a boom 38, and then passed over a second sheave wheel 36 and then guided on to drum 46. The second sheave wheel 36 is attached to a level-wind mechanism 48 with the level-wind mechanism also being attached to boom 38. Boom 38 is fixed to horizontal structure 50, the structure being fixed with respect to the location of borehole 22. Drum 42 rotates about its axis on mounts 52 which are likewise fixed with respect to the position of borehole 22. The probe 24 is raised and lowered in the borehole 22 by rotating drum 42 with a suitable motor drive unit (not shown). The second sheave 36 being mounted on level-wind track 48 assures that the retrieved cable is laid on the drum 46 in orderly layers as the probe is pulled from the borehole 22. The sheave wheel 34 cooperates with a depth indication unit 32 thereby sending signals by way of path 40 to the CPU 56 wherein the depth of the probe within the borehole is tracked.

The probe 24 contains a receiver coil 26 with the axis of the coil parallel to the axis of the probe. The primary field represented by force lines 74 induces voltage signals within the receiver coil 26. If a region of contrasting resistivity 70 is present within the survey area, the lines of force 72 resulting from eddy currents induce a secondary voltage signal within the receiver coil 26. The composite induced voltage, comprising the sum of primary and any secondary voltages, are amplified within the probe instrument section 28 to which the receiver coil is electrically connected. The instrument section 28 also contains a cable driver circuit which transmits the amplified composite signals to the surface over the cable 30. The signals are transmitted from the terminus of the cable 30 through slip-ring connectors 46 mounted near the axis of rotation of draw-works cable drum 42. The measured signals then pass from the slip rings 46 through electrical path 54 to an interface box 55. The frequency and amplitude of the signals are further adjusted with the circuitry within the interface box. The interface box also provides grounding for the system.

Signals are then passed from interface box 55 to a CPU 56 by way of electrical path 57. The CPU tracks the composite induced voltage signals from receiver coil 26 along with the corresponding depth indications from depth indication 32 and records these data with a suitable recording means 58. The CPU 56 and recording means 58 may be combined into a single unit such as a personal computer with sufficient data storage space such as computers of the type manufactured by IBM.

A second embodiment of the invention comprises a probe 24 which contains two receiver coils (not shown) axially mounted within the probe. The coils are spaced approximately two feet apart, with the coil having essentially the same number of windings and essentially the same physical dimensions. The windings of the two coils are, however, in opposite directions. Any voltage induced within the coils will be of opposite polarity. The outputs of induced voltages from the coils are summed. Because the primary field has a relatively long wave length in that it is slowly varying with depth z, the summing of outputs from the two coils tends to cancel the primary signal. On the other hand, the secondary signal exhibits a shorter wave length in that it varies in magnitude relatively rapidly as a function of z. The dual receiver coil or "field gradient" arrangement therefore enhances the measured secondary signal with respect to the primary signal. Although the field gradient coil arrangement does have advantages as outlines above, the basic concepts of the invention will be illustrated using the single receiver coil embodiment.

The probe 24 is dram or "logged" from the borehole 22 at a preferred rate of 10 feet per minute with readings of the induced voltage in receiver coil 26 being made and processed at preferably 0.1 foot depth intervals. Once the logging of the borehole is completed, the data are processed such that the primary induced voltage signal is removed leaving a measurement of secondary induced voltage as a function of depth. The data are further processed by converting the secondary signal, measured in millivolts, into equivalent formation resistivity in ohm-meters. The resulting log of resistivity as a function of depth within the borehole is referred to as a "pseudo resistivity log", using the terminology of the petroleum industry. The processing of measured induction data to generate the pseudo resistivity logs will be discussed in detail in a following section.

Figure 2:
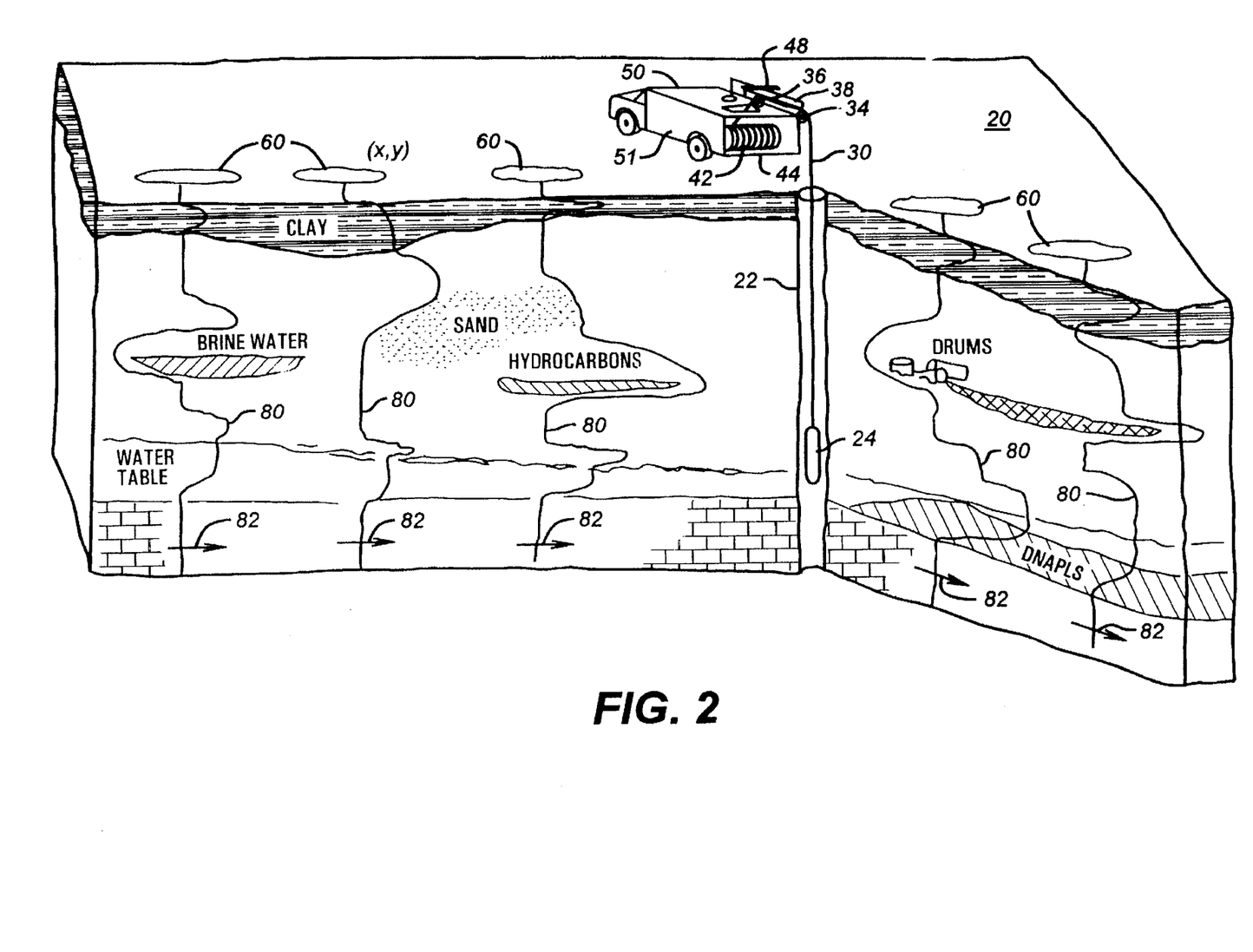
FIG. 2 illustrates the invention being applied to an area being surveyed, with representative measurements also being illustrated in sub regions which contain pollutants and in sub regions which do not contain pollutants.

FIG. 2 illustrates a typical arrangement for a survey of an area using the current invention. In the preferred embodiment, the draw-works, CPU and data recording means are contained within the vehicle 51 for mobility. Upon completion of each logging pass within the borehole 22, the transmitter coil 60 is positioned at a new location on the earth surface 20 and the borehole logging process is repeated. The process is continually repeated until the degree of coverage of the survey area is obtained.

FIG. 2 depicts a volume of earth formation in cross section wherein areas containing brine water, hydrocarbon, leaking metal drums and DNAPLS are present. Five positions of transmitter coil 60 are illustrated with corresponding pseudo resistivity logs 80 shown for each transmitter coil location. Arrows 82 indicate the direction of increasing resistivity of the pseudo resistivity logs. The coordinates (x,y) define the multiple locations of transmitter coil 60.

Generation of Pseudo Resistivity Logs

Figure 3A:
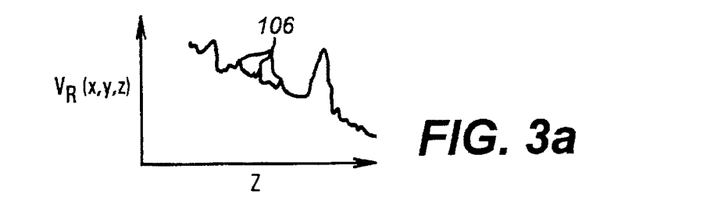
FIGS. 3a–3g depict graphically the steps employed in processing raw voltages measured in the receiver coil as a function of depth within the borehole, to eventually obtain a log of secondary resistivity in units of ohm-meters, again depicted as a function of depth within the borehole.
Figure 3B:
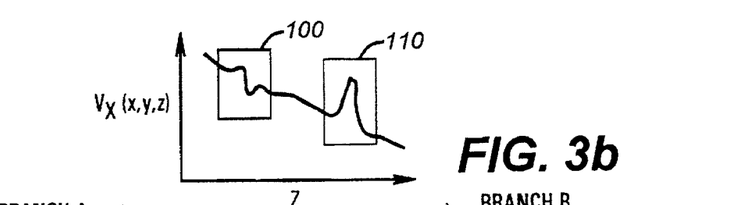

The processing of measured induced voltages to generate a pseudo resistivity log with the transmitter coil located a given position will be discussed first. $V_R(x,y,z)$ is defined as the raw voltage measured at the receiver coil 26 with the probe 24 at a depth z within the borehole and the transmitter coil 60 at a position (x,y) on the surface of the earth. $V_R(x,y,z)$ plotted as a function of z is shown in FIG. 3a. The raw data $V_R(x,y,z)$ may contain spurious, high frequency noise 106 which is either induced by system hardware or may be environmental in nature. Such noise, if present, is removed by filtering of the raw data yielding (1) $V_X(x,y,z)=F[V_R(x,y,z)]$ where F is a suitable smoothing filter function in z to remove any high frequency noise component. The result of the removal of noise is illustrated in FIG. 3b as a plot of $V_X(x,y,z)$ as a function of z. At this point, the processing is branched based upon the magnitude of the higher frequency secondary signal with respect to the lower frequency primary signal. If the secondary signal is relatively small with respect to the primary signal, as illustrated in the region designated by the numeral 100 in FIG. 3b, processing designated as branch A is applied. If the secondary signal dominates the measured response, as is illustrated in the region designated by the numeral 110 in FIG. 3b, processing designated as branch B is followed.

Figure 3C:
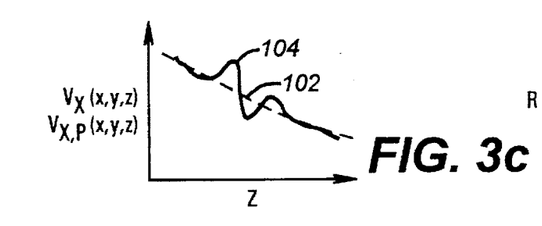
Figure 3D:
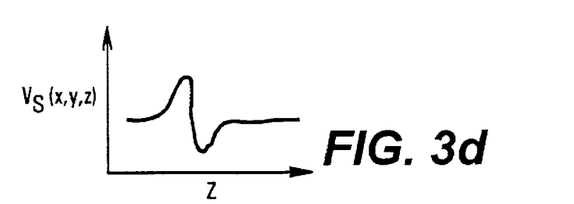
Figure 3E:
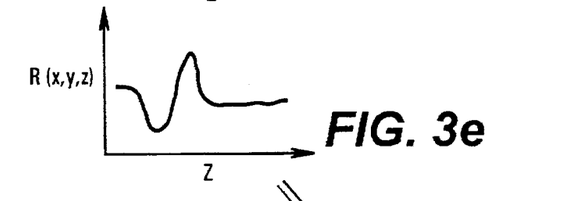

Branch A processing is first discussed. A forty point filter in z, which corresponds to a 4 foot filter for the preferred sample rate of 10 points per foot, is applied to $V_X(x,y,z)$ yielding (2) $V_{X,P}(x,y,z) = \left[ \sum_{z-20}^{z+20} V_X(x,y,z) \right] / 40$ $V_{X,P}(x,y,z)$ is treated as the primary signal and is illustrated in FIG. 3c by the numeral 102 along with $V_X(x,y,z)$ denoted by the numeral 104. The secondary signal, $V_S(x,y,z)$, is computed from the relationship (3) $V_S(x,y,z)=V_X(x,y,z)/V_{X,P}(x,y,z)$ and is plotted as a function of z in FIG. 3d. The premise is that the slowly varying component in z or the long wave length component of the measured induced voltage is due to unpolluted "background" regions of the survey area. Rapidly varying components in z or short wave length components are due to relatively confined areas of contrasting resistivity, namely areas of pollution. $V_X(x,y,z)$ is denoted by the numeral 104. Recall that $V_S(x,y,z)$ is still in units of millivolts induced by the fields in the receiver coil 26. It is necessary to convert this parameter to equivalent resistivity in order to generate the desired pseudo resistivity log. This is accomplished by using a transform of the form (4) $R(x,y,z)=R_A[(1-V_S(x,y,z))/(1+V_S(x,y,z))]$ where $R(x,y,z)$ is the secondary signal in resistivity units of ohm-meters and $R_A$ is the average resistivity of the survey area, also in units of ohm-meters. $R(x,y,z)$ as a function of z is illustrated in FIG. 3e. This transformation is very important in that the measured secondary resistivity signal is now in units which can be compared and combined with other information for correlation purposes such as conventional resistivity logs. Furthermore, secondary signal in units of resistivity can be related to the types of anomalies. As examples, high and low resistivity anomalies might suggest that the pollutants are hydrocarbons and brines, respectively.

Figure 3F:
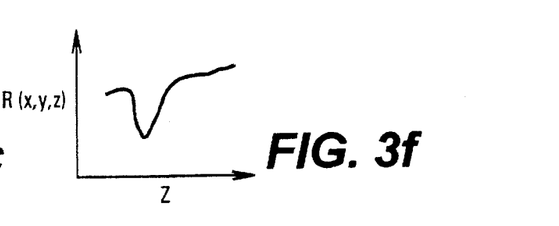
Figure 3G:
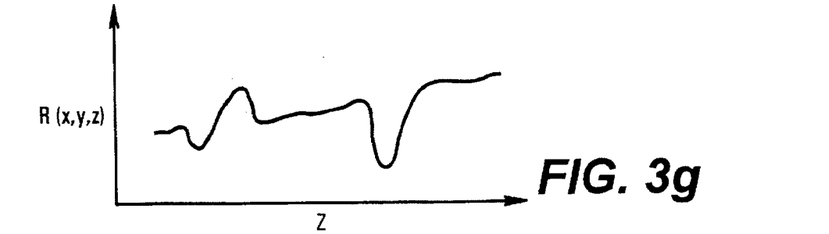

Turning now to branch B of the data processing, it is assumed that the measured voltage $V_X(x,y,z)$ is predominately secondary signal. In this case, $R(x,y,z)$ is computed from the relation (5) $R(x,y,z)=R_A[(1-V_X(x,y,z))/(1+V_X(x,y,z))]$ where, again, $R_A$ is the average resistivity of the survey area. This step is illustrated as $R(x,y,z)$ plotted as a function of z in FIG. 3f. The final step in the processing is the combining of the processing results of branches A and B to form a pseudo resistivity log over the entire logged borehole as illustrated in FIG. 3g. It should be noted that any error in the estimated value of $R_A$ will result in an offset of the pseudo resistivity log, the algebraic sign and magnitude of the offset being proportional to the algebraic sign and magnitude of the estimated error. This is not critical in the determination of possible regions of pollution since resistivity contrast, rather than absolute resistivity magnitude, is the primary criterion.

It is noted that the conversion of data from millivolts to resistivity in units of ohm-meters can be accomplished at any point in the data processing scheme. The point at which the conversion is made is not critical to the disclosed means and methods. As an example, data measured in millivolts could be converted to resistivity values prior to the noise filtering step as illustrated in FIG. 3a, or after noise filtering, or at virtually any point in the sequential data processing chain without adverse effects. In principle, areas of contrasting resistivity could be mapped without converting the measured induced voltages to equivalent resistivity. Interpretation of the results, such as the identification of the type of pollutant, is aided by conversion to resistivity. The preferred embodiment, however, employs the conversion of measured data in millivolts to resistivity as detailed above.

At this point in the data processing, a pseudo resistivity log has been generated for the transmitter coil 60 located at coordinates (x,y) on the earth surface. The transmitter coil is move to a multiplicity of positions (x,y) over the survey area, the borehole 22 is relogged for each transmitter coil position, and corresponding pseudo resistivity logs are generated using the previously described procedures. The results of this survey process is a set of pseudo resistivity logs of secondary signals over the entire survey area, with z=0 corresponding to the top of the borehole. It should be realized, however, that the topography of the survey area might not be level. Stated another way, the elevation of each transmitter coil location might, and usually does, vary with respect to the top of the borehole 22. It is necessary, therefore, to normalize all pseudo resistivity logs to a reference elevation $z_r$, which, for example, might be the average elevation of all transmitter coil locations, or might be the elevation of the top of the borehole. For either choice of $z_r$, it is necessary to shift or normalize all pseudo resistivity logs to a common reference elevation before three dimensional processing and display of the area survey data. It might also be necessary to shift pseudo resistivity log data in a non-linear manner should, for example, the cable 30 stretch inelastically during the sequential logging of the borehole for each transmitter coil position. Upon completion of any necessary shifting of the set of pseudo resistivity log data, the data set is now ready for three dimensional processing, mapping and display.

GEOMETRIC LIMITS

Transmitter coil-receiver coil distances are usually within the range of 20 feet to 300 feet. The geometry of the transmitter and receiver coils must comprise two vertical dipoles separated by a distance great enough to insure coplanar configuration. Once the transmitter coil-receiver coil distance is less than about two times the depth of the probe 24, large spurious artifacts are seen in the raw data which cannot be removed by post processing. It is essential, therefore, that the survey be made within the geometric limits of the invention in order that meaningful data be measured and processed.

GRAPHIC DISPLAY OF THE SET OF PSEUDO RESISTIVITY LOG DATA

Figure 4:
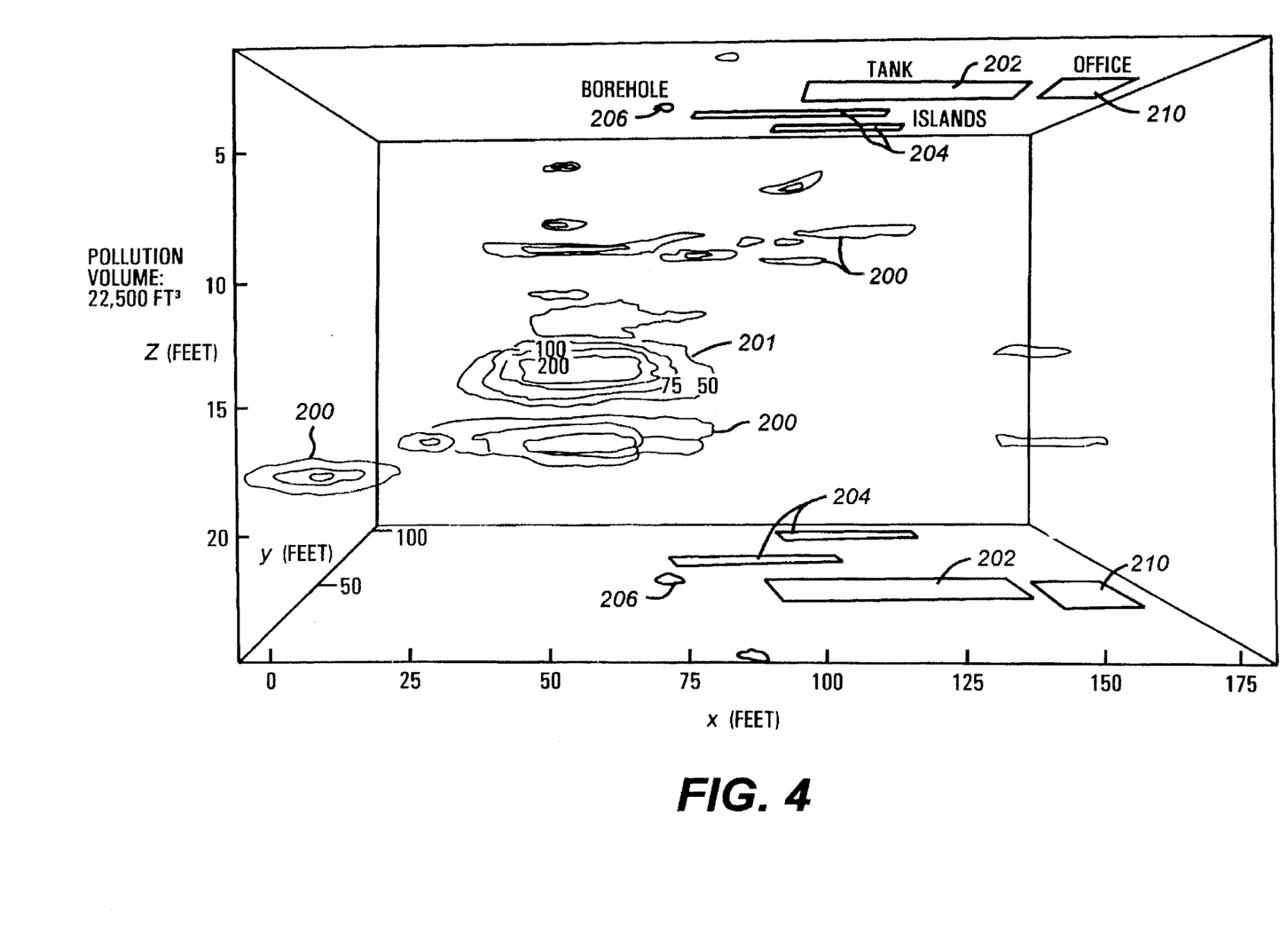
FIG. 4 shows a three dimensional display of regions of contrasting resistivity within the survey area, with these contrasting resistivities being related to the location and magnitude of pollutants within the survey area.

The multiple resistivity logs comprise a three dimensional set of secondary resistivities, R(x,y,z), measured within the survey site. These data are used as input for a three dimensional geo-visualization and processing software package such as one offered by Dynamic Graphics, Inc. A three dimensional map of resistivity of the survey area is created. An example of such a map or contour is shown in FIG. 4. This particular survey was made at a gasoline service station. Images of key structures are shown in the x-y plane such as pump islands 204, borehole 206, an underground storage tank 202, and the station office 210. Three dimensional contours of 25, 50, 75, 100 and 200 ohm-meters are illustrated as an example in high resistivity area 201. Other highly resistive fluids and materials form a rather complex system of resistivity anomalies, identified by the numeral 200. Hydrocarbon fluids appear to be leaking from the underground storage tank 202 as well as from the pump islands 204.

Volumetrics can also be calculated from the resistivity contours. In the survey example depicted in FIG. 4, approximately 22,500 cubic feet of survey area contain measurable pollutants within the total survey volume of 437,500 cubic feet. The ability to compute pollutant volume is an important feature of the invention in that the degree of pollution can be determined and the required remedial actions can be based upon these volumetric computations.

What is claimed is:

1. An apparatus for measuring for pollutants contaminating earth formations as indicated by regions of contrasting resistivity of subsurface earth formations located in an area of interest indicated in data obtained by making spatially continuous measurements of electrical resistivity properties of the earth formations, comprising:

(a) a transmitter adapted to be positioned at multiple locations on the surface of the earth in the vicinity of a borehole located in the area of interest, said transmitter inducing magnetic fields within the earth in the area of interest;

(b) means for powering said transmitter;

(c) an elongated probe comprising at least one receiver for measuring magnetic field data in the area of interest;

(d) means for conveying said probe along said borehole through the formations in the area of interest;

(e) means for providing power to said probe;

(f) means for measuring the depth of said probe within said borehole;

(g) means for transmitting magnetic field data measured by said probe to the surface of the earth;

(h) means for processing said magnetic field data to obtain a measure of electrical properties of earth formation in the area of interest, said processing means comprising:

means for correlating said magnetic field data measured by said probe with said measures of depth of the probe at which said magnetic field data are measured;

means for separating from said measured magnetic field data the contribution due to secondary magnetic fields induced by said transmitter due to contrasting resistivity caused by pollutants; and (i) means for generating a spatially continuous map of the secondary magnetic field portion of said measured magnetic field data in the area of interest due to contrasting resistivity, thus indicating locations of contaminating pollutants.

2. The apparatus of claim 1, wherein said transmitter induces a magnetic field at each of said multiple spaced transmitter locations, said magnetic field being induced within the subsurface earth formations between said surface transmitter location and said probe receiver in the borehole.

3. A method of measuring for pollutants contaminating earth formations as indicated by regions of contrasting resistivity of subsurface earth formations in an area of interest indicated in data obtained by making spatially continuous measurements of the resistivity of the earth formations the steps of:

(a) positioning an essentially circular transmitter coil at multiple spaced locations on the surface of the earth, the axis of said transmitter coil being essentially normal to the plane of the earth surface, and for each transmitter coil location;

(1) applying an alternating current to said transmitter thereby inducing a primary magnetic field within the earth in the area of interest beneath said transmitter coil;

(2) generating a secondary magnetic field through interaction of said primary field with any regions of contrasting resistivity indicative of contaminating pollutants within the earth in the area of interest beneath said transmitter coil;

(3) employing a cable and draw works to convey a probe along a borehole where said borehole is located in the area of interest, spaced from said transmitter coil locations, said probe containing at least one receiver in which voltage is induced by said primary and said secondary magnetic fields;

(4) measuring with the probe receiver the composite strength of said primary and said secondary magnetic fields as a function of depth in said borehole;

(5) determining the values of said secondary magnetic field as a function of depth within said borehole from said measured composite of said primary and said secondary magnetic fields;

(b) computing from said secondary magnetic field values determined as a function of depth for each transmitter coil location a spatially continuous, three dimensional map indicative of said regions of contrasting resistivity in the area of interest; and (c) forming a graphic display of the resistivity properties to indicate the regions of contrasting resistivity as locations of contaminating pollutants.

4. The method of claim 3 wherein the depth of said probe within said borehole is determined with a depth indicating unit in cooperation with a calibrated sheave wheel and said cable.

5. The method of claim 4 wherein resistivity values are computed from said secondary magnetic field values utilizing the average resistivity of earth formation in the area of interest.

6. The method of claim 5, wherein the values of said secondary magnetic field and said graphic display of resistivity properties are determined subsequent to said step of measurement of said composite primary and secondary magnetic fields as a function of depth in said borehole for all said transmitter coil locations.

7. The method of claim 6 wherein said resistivity values measured as a function of depth for each transmitter coil location are normalized to a reference depth prior to said step of forming a graphic display.

8. The method of claim 7 wherein two dimensional maps of resistivity are taken from said three dimensional map for any plane of orientation.

9. The method of claim 7 wherein the volume of earth formation within predetermined resistivity ranges are calculated from said spatially continuous maps of formation resistivity.

10. The method of claim 9 wherein said values of secondary magnetic field are determined form the response of one receiver coil within said probe.

11. The method of claim 10 wherein the axis of said receiver coil is parallel to the axis of said probe.

12. The method of claim 9 wherein said values of secondary magnetic field are determined from the combined responses of two receiver coils within said probe.

13. The method of claim 12 wherein said two receiver coils are longitudinally spaced within said probe, with the axes of both said receiver coils being parallel to the axis of said probe.

14. An apparatus for locating pollutants contaminating earth formations as indicated by regions of contrasting resistivity of subsurface earth formations in an area of interest indicated in data obtained by making spatially continuous dimensional maps of resistivity of the subsurface earth formations, comprising;
   (a) an essentially circular transmitter coil adapted to be positioned at multiple locations on the surface of the earth in the vicinity of a borehole for energy at a tuned frequency in a range between 100 and 1000 hertz to induce within the earth in the area of interest;
   (b) means for supplying alternating current to said coil to cause transmission of the energy;
   (c) an elongated probe containing at least one receiver coil for measuring magnetic field data in the area of interest;
   (d) means for conveying said probe along
   (e) means for providing power to said probe;
   (f) a probe depth indicating unit cooperating with said of conveying said probe along said borehole;
   (g) means for transmitting magnetic field data by said at least one receiver coil in said probe to the surface of the earth;
   (h) means for processing said magnetic field to obtain a measure of resistivity of earth formation in the area of interest, said processing means including:
      (1) means for correlating said field data measured by said probe with corresponding measures of depth of the probe by said probe depth measuring means;
      (2) means for separating the portion of said magnetic field data caused by localized resistivity anomalies in surrounding earth formations;
      (3) means for converting said separated portion of said magnetic field data to corresponding resistivity values of localized resistivity anomalies indicative of locations of contaminating pollutants; and
   (i) means for generating a spatially continuous three dimensional map of said localized resistivity anomalies indicative of locations of contaminating pollutants in the area of interest.

15. The apparatus of claim 14 wherein the diameter of said essentially circular transmitter coil is between two feet and ten feet.

16. The apparatus of claim 14 wherein said elongated probe contains one receiver coil with the axis of the coil parallel to the axis of said elongated probe.

17. The apparatus of claim 14 wherein said elongated probe contains two longitudinally spaced receiver coils with the axis of each coil parallel to the axis of said elongated probe.

18. The method of claim 3, wherein said step of inducing a primary field comprises the step of:
   inducing a magnetic field at each of said multiple spaced transmitter locations, said magnetic field being-induced within the subsurface earth formations between said surface transmitter location and said probe receiver in the borehole.

19. The apparatus of claim 14, wherein said transmitter coil induces a magnetic field at each of said multiple spaced transmitter locations, said magnetic field being induced within the subsurface earth formations between said surface transmitter location and said probe receiver in the borehole.

* * * * *